(12) United States Patent
Nakamatsu et al.

(10) Patent No.: US 7,221,850 B2
(45) Date of Patent: May 22, 2007

(54) INFORMATION PROCESSING APPARATUS AND METHOD, AND RECORDING MEDIUM

(75) Inventors: Keita Nakamatsu, Kanagawa (JP); Takuji Himeno, Chiba (JP)

(73) Assignee: Sony Corporation, Tokyo (JP)

( * ) Notice: Subject to any disclaimer, the term of this patent is extended or adjusted under 35 U.S.C. 154(b) by 1417 days.

(21) Appl. No.: 09/880,305

(22) Filed: Jun. 13, 2001

(65) Prior Publication Data

US 2002/0018645 A1 Feb. 14, 2002

(30) Foreign Application Priority Data

Jun. 14, 2000 (JP) .............................. 2000-178727

(51) Int. Cl.
*H04N 5/93* (2006.01)
(52) U.S. Cl. .............................. 386/52; 386/54; 386/61; 386/109
(58) Field of Classification Search .................. 386/52, 386/54, 61, 109
See application file for complete search history.

(56) References Cited

U.S. PATENT DOCUMENTS

| 5,999,692 | A | * | 12/1999 | Schmidt et al. | ................ | 386/54 |
| 6,091,555 | A | * | 7/2000 | Nagai et al. | ................... | 386/54 |
| 6,718,119 | B1 | * | 4/2004 | Fujinami | ....................... | 386/52 |
| 6,952,521 | B2 | * | 10/2005 | Kelly et al. | .................... | 386/52 |

* cited by examiner

*Primary Examiner*—James J. Groody
*Assistant Examiner*—James A. Fletcher
(74) *Attorney, Agent, or Firm*—Frommer Lawrence & Haug LLP; William S. Frommer; Paul A. Levy

(57) ABSTRACT

When MPEG streams are connected, audio data is connected without losing continuity, so that playback data which is not unnatural is obtained. In a case where data of videos of a stream is connected to immediately after another video of another stream and these are edited to create still another stream, if a soundless portion occurs, or if an audio is directly connected to another audio and the audio data leads the video data, unnatural playback data results. Therefore, by inserting still another audio, as audio data at the connection point of the still another stream, corresponding to the video to be erased between the still another audio and still another audio, playback data which is not unnatural can be obtained.

7 Claims, 13 Drawing Sheets

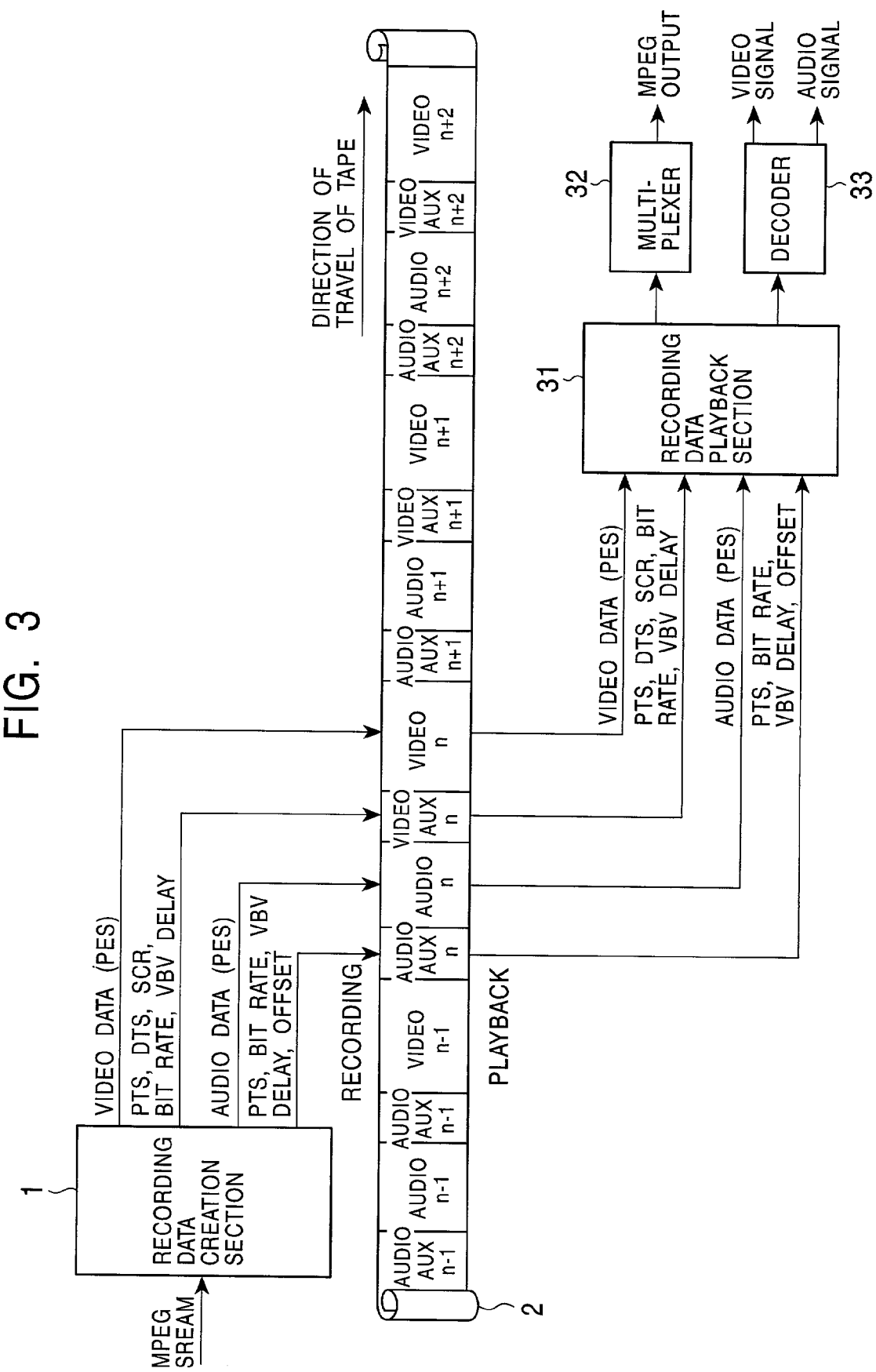

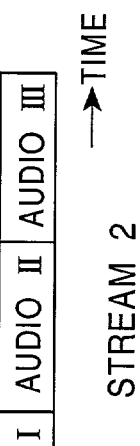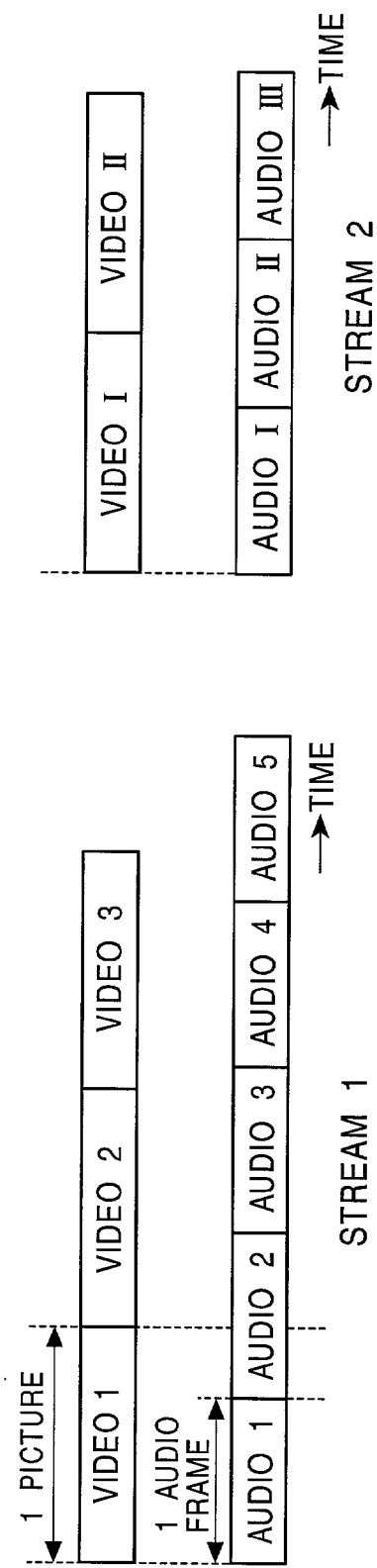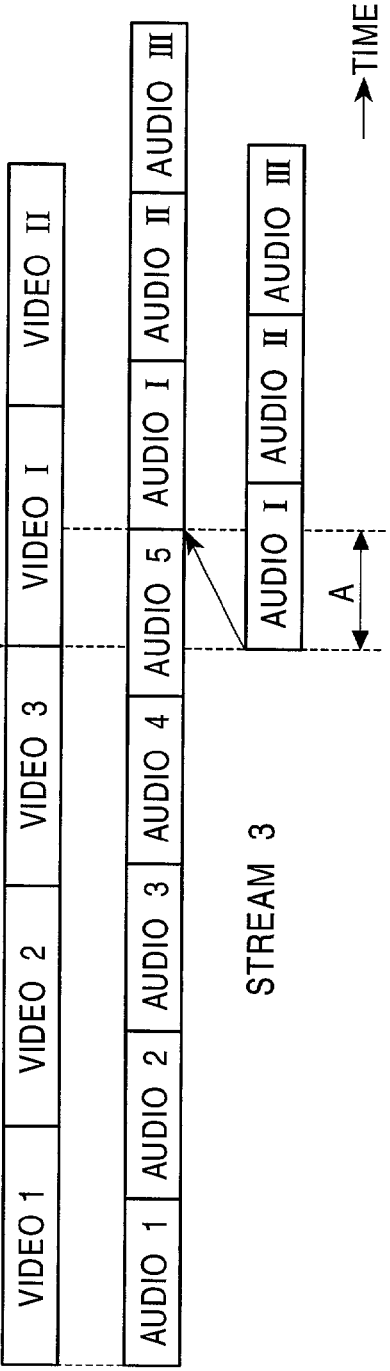

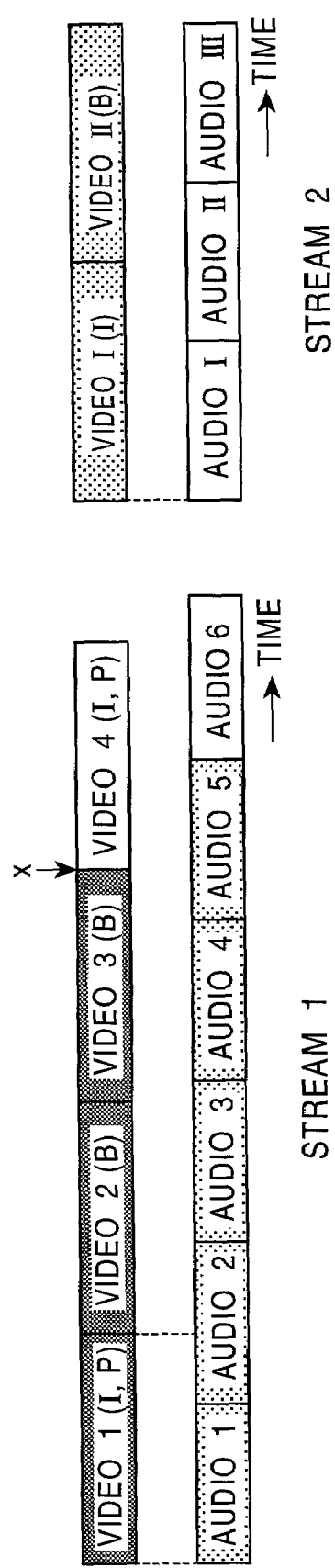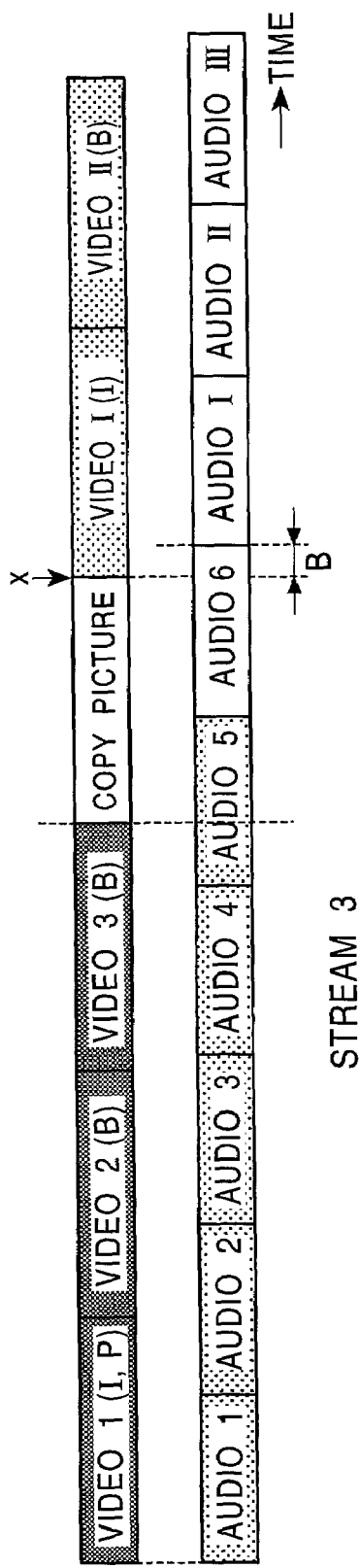

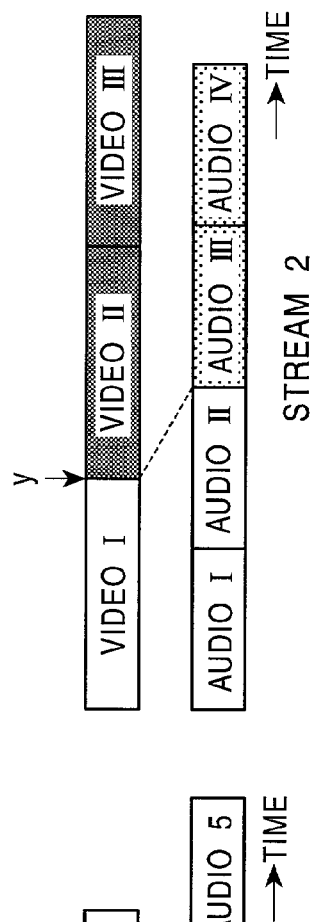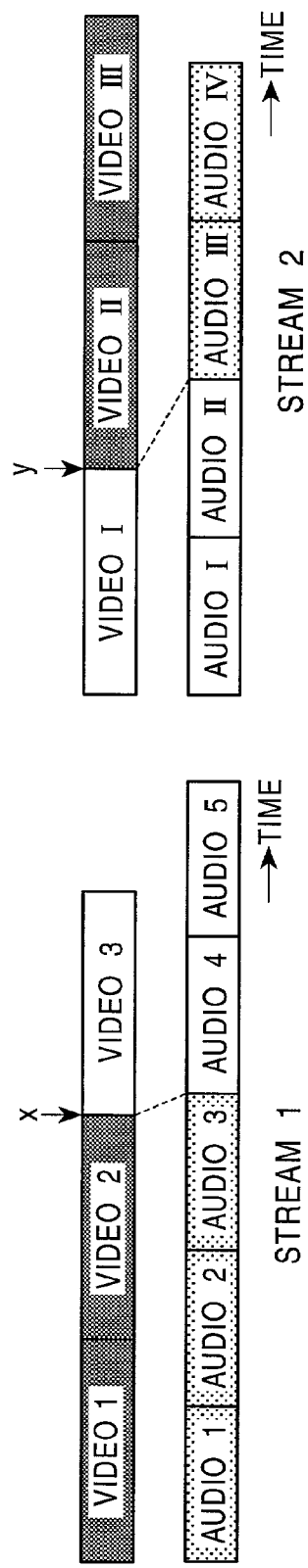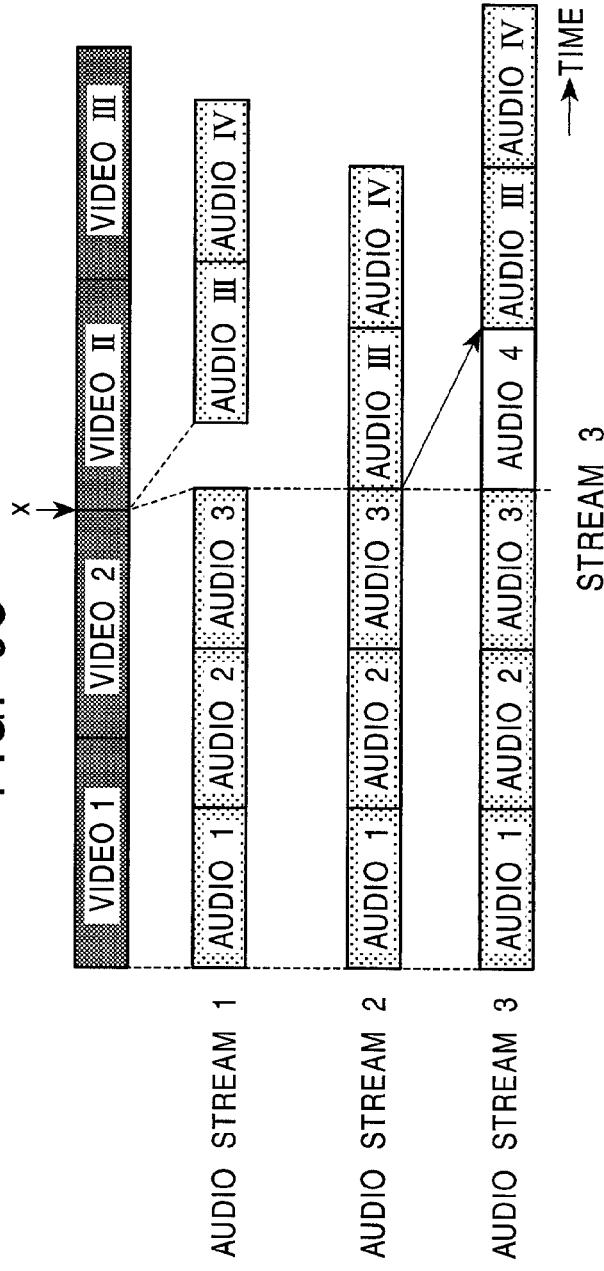

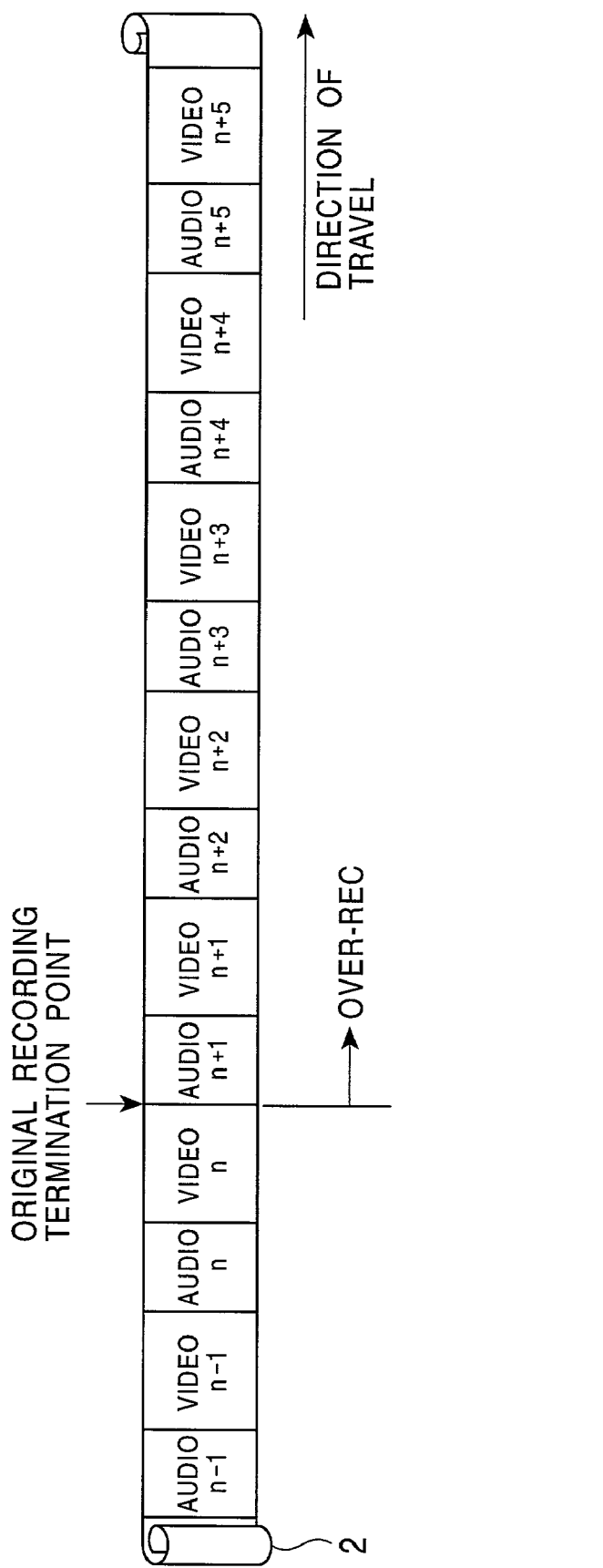

FIG. 11

| OVERWRITE START POINT | REMAINING AUDIO DATA | INVALID VIDEO DATA |
|---|---|---|
| POINT A | NONE | NONE |
| POINT B | AUDIO 3 | VIDEO 3 |
| POINT C | AUDIO 3, 4 | VIDEO 3, 4 |
| POINT D | AUDIO 3, 4 | VIDEO 3, 4, 5 |
| POINT E | AUDIO 3, 4, 5, 6 | VIDEO 3, 4, 5, 6 |
| POINT F | AUDIO 3, 4, 5, 6, 7 | VIDEO 3, 4, 5, 6, 7 |

INFORMATION PROCESSING APPARATUS AND METHOD, AND RECORDING MEDIUM

BACKGROUND OF THE INVENTION

1. Field of the Invention

The present invention relates to an information processing apparatus and method, and to a recording medium. More particularly, the present invention relates to an information processing apparatus and method in which, when two MPEG streams are connected, the audio data playback timing is shifted so that the audio data can be played back continuously so that continuous audio data can be played back at the point where the two MPEG streams are connected, and to a recording medium.

2. Description of the Related Art

In a case where audio data is compressed, the audio data is divided in predetermined units, and compression is performed within the divided data. When the audio data compressed in this manner is edited and connected, connection is possible only in divided data units (that is, connection is not possible from the middle of data units).

The real time length of the data unit in the compression of audio data does not match the frame length of video data. For example, in MPEG (Moving Picture Coding Experts Group/Moving Picture Experts Group), for the video data, in a 29.97 Hz system, the number of time stamps (TS) of one frame is 3003, whereas for audio data, in an 48 kHz MPEG2 Audio Layer II, the number of TSs of one frame is 2160.

For example, in a data stream, such as MPEG, for which video and audio are handled at the same time, when data streams are connected, since connection is performed by using the video data as a reference, at the connection point, continuity of the audio data is lost for compressed audio data having a period different from that of the video data.

Since audio data with lost continuity causes, for example, a failure of a decoding buffer to occur, there is a possibility that decoding cannot be performed correctly in a decoding device. For example, in a case where, in order to maintain the continuity of audio data, the phase lag between a video signal and an audio signal is admitted and the audio signal is directly made continuous, unnatural playback data, such as, for example, the audio data being played back prior to the video data, might result.

Furthermore, depending on the video data to be connected, there are cases in which, in order to prevent the failure of a decoding buffer, a still image whose coding rate is close to zero is inserted at a connection point, so that the processing of the decoding buffer is in time. In such a case, unless audio corresponding to the still image to be inserted is provided, a soundless state occurs in the connection point, and unnatural playback data results.

SUMMARY OF THE INVENTION

The present invention has been made in view of such circumstances. An object of the present invention is to play back continuous audio data, without the audio data sounding unnatural, at a connection point of two MPEG streams by shifting the audio data playback timing so that the audio data can be played back continuously in a case where two MPEG streams are connected.

To achieve the above-mentioned object, according to one aspect of the present invention, there is provided an information processing apparatus comprising: separation means for separating each of a first data stream and a second data stream into video data and audio data; first detection means for detecting the amount of deviation, with respect to time, between the video data and the audio data of the first data stream, which are separated by the separation means, and the amount of deviation, with respect to time, between the video data and the audio data of the second data stream, which are separated by the separation means; first computation means for computing the amount of shift of the audio data of the second data stream with respect to the video data of the second data stream on the basis of the two amounts of deviation detected by the first detection means; creation means for combining the video data of the first data stream and the second data stream, the audio data of the first data stream and the second data stream, and system data containing the amount of shift computed by the first computation means in order to create a third data stream; control means for controlling, based on the amount of shift computed by the first computation means, the creation means in such a way that the audio data of the second data stream is shifted in time with respect to the video data of the second data stream corresponding thereto; and recording control means for controlling recording of the third data stream created by the creation means onto a recording medium.

The information processing apparatus may further comprise second detection means for detecting the coding rate of the video data of one picture at the connection point of the first data stream with respect to the second data stream, and the coding rate of the video data of one picture at the connection point of the second data stream with respect to the first data stream; and second computation means for computing, based on the two coding rates detected by the second detection means, the amount of still image data inserted at the connection point of the first data stream and the second data stream, wherein, when it is determined by the second computation means that the amount of data is not zero, the creation means further combines the still image data, of the amount of data computed by the second computation means, with the video data of the first data stream and the second data stream, the audio data of the first data stream and the second data stream, and the system data containing the amount of shift computed by the first computation means in order to create a third data stream.

The audio data of the second data stream may be shifted by the control means in such a way that the audio data is played back continuously without being re-encoded from the second data stream.

The information processing apparatus may further comprise reading control means for controlling reading of the first data stream recorded on the recording medium; and input control means for controlling the input of the first data stream read by the reading control means into the separation means.

The first data stream and the second data stream may be MPEG data streams.

According to another aspect of the present invention, there is provided an image processing method comprising the steps of: separating each of a first data stream and a second data stream into video data and audio data; detecting the amount of deviation, with respect to time, between the video data and the audio data of the first data stream, which are separated in the separation step, and the amount of deviation, with respect to time, between the video data and the audio data of the second data stream, which are separated in the separation step; computing the amount of shift of the audio data of the second data stream with respect to the video data of the second data stream on the basis of the two amounts of deviation detected in the detection step; combining the video data of the first data stream and the second data stream, the audio data of the first data stream and the second data stream, and system data containing the amount of shift computed in the computation step in order to create a third data stream; controlling, based on the amount of shift computed in the computation step, the creation step in such a way that the audio data of the second data stream is shifted in time with respect to the video data of the second data stream corresponding thereto; and controlling recording of the third data stream created in the creation step on a recording medium.

According to another aspect of the present invention, there is provided a recording medium having recorded thereon a program, the program comprising the steps of: separating each of a first data stream and a second data stream into video data and audio data; detecting the amount of deviation, with respect to time, between the video data and the audio data of the first data stream, which are separated in the separation step, and the amount of deviation, with respect to time, between the video data and the audio data of the second data stream, which are separated in the separation step; computing the amount of shift of the audio data of the second data stream with respect to the video data of the second data stream on the basis of the two amounts of deviation detected in the detection step; combining the video data of the first data stream and the second data stream, the audio data of the first data stream and the second data stream, and system data containing the amount of shift computed in the computation step in order to create a third data stream; controlling, based on the amount of shift computed in the computation step, the creation step in such a way that the audio data of the second data stream is shifted in time with respect to the video data of the second data stream corresponding thereto; and controlling recording of the third data stream created in the creation step on a recording medium.

According to another aspect of the present invention, there is provided an information processing apparatus comprising: recording control means for controlling recording, on the recording medium, of a second data stream which is connected to a first position of a first data stream so that these streams are played back, wherein the recording control means controls recording of the second data stream in such a way that recording of the second data stream is started from a second position which is shifted by a predetermined time from the first position of the first data stream.

According to another aspect of the present invention, there is provided an information processing method comprising the step of controlling recording, on the recording medium, of a second data stream which is connected to a first position of a first data stream so that these streams are played back, wherein, in the recording control step, recording of the second data stream is controlled in such a way that recording of the second data stream is started from a second position which is shifted by a predetermined time from the first position of the first data stream.

According to another aspect of the present invention, there is provided a recording medium having recorded thereon a program, the program comprising the step of: controlling recording, on the recording medium, of a second data stream which is connected to a first position of the first data stream so that these streams are played back, wherein, in the recording control step, recording of the second data stream is controlled in such a way that recording of the second data stream is started from a second position which is shifted by a predetermined time from the first position of the first data stream.

According to another aspect of the present invention, there is provided an information processing apparatus comprising: reading control means for controlling reading of a first data stream and a second data stream which are recorded on a recording medium; separation means for separating each of the first data stream and the second data stream, whose reading is controlled by the reading control means, to video data and audio data; first detection means for detecting the amount of deviation, with respect to time, between the video data and the audio data of the first data stream, which are separated by the separation means, and the amount of deviation, with respect to time, between the video data and the audio data of the second data stream, which are separated by the separation means; first computation means for computing the amount of shift of the audio data of the second data stream with respect to the video data of the second data stream on the basis of the two amounts of deviation detected by the first detection means; delaying means for delaying the audio data of the second data stream; control means for controlling, based on the amount of shift computed by the first computation means, the delaying means in such a way that the audio data of the second data stream is shifted in time with respect to the video data of the second data stream corresponding thereto; and rewriting means for rewriting time information contained in the video data and the audio data of the second data stream.

The information processing apparatus may further comprise second detection means for detecting the coding rate of the video data of one picture at the connection point of the first data stream with respect to the second data stream, and the coding rate of the video data of one picture at the connection point of the second data stream with respect to the first data stream; second computation means for computing, based on the two coding rates detected by the second detection means, the amount of still image data inserted at the connection point of the first data stream and the second data stream; and insertion means for inserting the still image data, of the amount of data computed by the second computation means, into the connection point between the video data of the first data stream and the video data of the second data stream when it is determined by the second computation means that the amount of data is not zero.

According to another aspect of the present invention, there is provided an information processing method comprising the steps of: controlling reading of a first data stream and a second data stream, which are recorded on a recording medium; separating each of the first data stream and the second data stream, whose reading is controlled by the process of the reading control step, into video data and audio data; detecting the amount of deviation, with respect to time, between the video data and the audio data of the first data stream, which are separated by the process of the separation step, and the amount of deviation, with respect to time, between the video data and the audio data of the second data stream, which are separated by the process of the separation step; computing the amount of shift of the audio data of the second data stream with respect to the video data of the second data stream on the basis of the two amounts of deviation detected by the process of the detection step; delaying the audio data of the second data stream; controlling, based on the amount of shift computed by the process of the computation step, the delaying step in such a way that the audio data of the second data stream is shifted in time with respect to the video data of the second data stream corresponding thereto; and rewriting time information contained in the video data and the audio data of the second data stream.

According to another aspect of the present invention, there is provided a recording medium having recorded thereon a program, the program comprising the steps of: controlling reading of a first data stream and a second data stream, which are recorded on a recording medium; separating each of the first data stream and the second data stream, whose reading is controlled by the process of the reading control step, into video data and audio data; detecting the amount of deviation, with respect to time, between the video data and the audio data of the first data stream, which are separated by the process of the separation step, and the amount of deviation, with respect to time, between the video data and the audio data of the second data stream, which are separated by the process of the separation step; computing the amount of shift of the audio data of the second data stream with respect to the video data of the second data stream on the basis of the two amounts of deviation detected by the process of the detection step; delaying the audio data of the second data stream; controlling, based on the amount of shift computed in the computation step, the delaying step in such a way that the audio data of the second data stream is shifted in time with respect to the video data of the second data stream corresponding thereto; and rewriting time information contained in the video data and the audio data of the second data stream.

In the information processing apparatus, the image processing method, and the program recorded on a recording medium in accordance with the first aspect of the present invention, each of the first data stream and the second data stream is separated into video data and audio data. The amount of deviation with respect to time between the separated video data and audio data of the first data stream and the amount of deviation with respect to time between the separated video data and audio data of the second data stream are detected. Based on the two detected amounts of deviation, the amount of shift of the audio data of the second data stream with respect to the video data of the second data stream is detected. The video data of the first data stream and the second data stream, the audio data of the first data stream and the second data stream, and system data containing the computed amount of shift are combined to create a third data stream. Based on the computed amount of shift, recording of the third data stream on a recording medium is controlled, the third data stream being controlled and created in such a way that the audio data of the second data stream is shifted in time, with respect to the video data of the second data stream.

In the information processing apparatus, the image processing method, and the program recorded on a recording medium in accordance with the second aspect of the present invention, the recording, onto a recording medium, of the second data stream which is connected at the first position of the first data stream so that these streams are played back is controlled. The recording of the second data stream is controlled so that the recording of the second data stream is started from a second position deviated by a predetermined time from the first position of the first data stream.

In the information processing apparatus, the image processing method, and the program recorded on a recording medium in accordance with the third aspect of the present invention, the reading of the first data stream and the second data stream which are recorded on the recording medium is controlled. Each of the read first data stream and the read second data stream is separated into video data and audio data, the amount of deviation with respect to time between the separated video data and audio data of the first data stream. The amount of deviation with respect to time between the separated video data and audio data of the second data stream are detected. Based on the two amounts of deviation, the amount of shift of the audio data of the second data stream with respect to the video data of the second data stream is computed. The audio data of the second data stream is delayed. Based on the computed amount of shift, delay is controlled so that that the audio data of the second data stream is shifted in time with respect to the video data of the second data stream corresponding to thereto. The time information contained in the video data and the audio data of the second data stream is rewritten.

The above and further objects, aspects and novel features of the invention will become more fully apparent from the following detailed description when read in conjunction with the accompanying drawings.

BRIEF DESCRIPTION OF THE DRAWINGS

FIG. 3 is a diagram illustrating data recorded on a magnetic tape;

FIGS. 4A, 4B, and 4C are diagram illustrating the shift of audio data when two MPEG streams are connected;

FIGS. 5A, 5B, and 5C are diagram illustrating a copy picture and addition of audio data corresponding thereto when two MPEG streams are connected;

FIGS. 6A, 6B, and 6C are diagram illustrating the shift of audio data when two MPEG streams are connected;

FIG. 7 is a diagram illustrating over-recording;

FIG. 11 is a diagram illustrating remaining audio data and invalid video data, corresponding to the overwrite starting point of FIG. 10;

DESCRIPTION OF THE PREFERRED EMBODIMENTS

The preferred embodiments of the present invention will now be described below with reference to the attached drawings.

Figure 1:
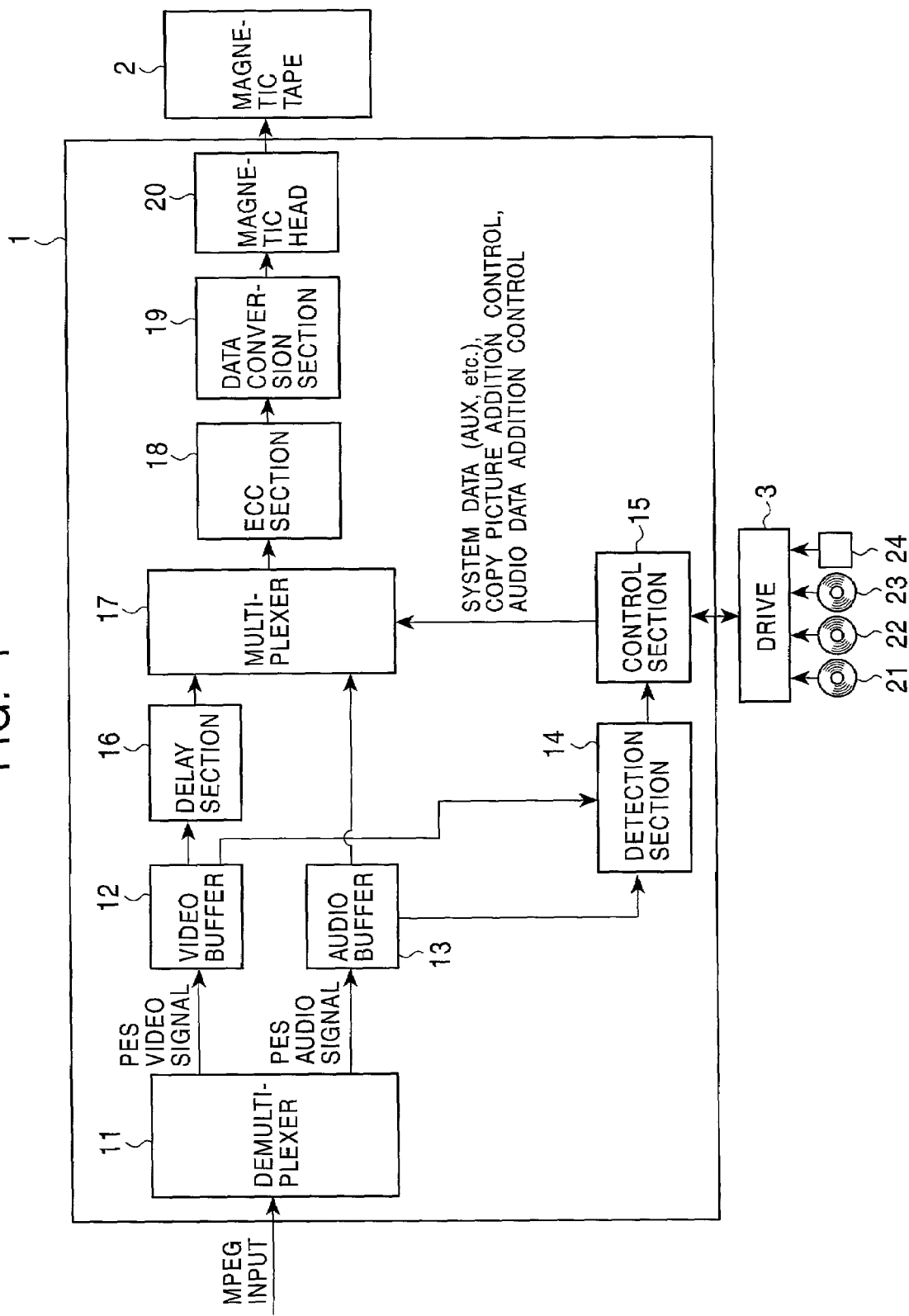
FIG. 1 is a block diagram showing the construction of a recording data creation section.

FIG. 1 is a block diagram showing the construction of a recording data creation section 1 for recording input MPEG data on a magnetic tape 2 in a magnetic tape recording apparatus or a magnetic tape playback apparatus according to the present invention.

An MPEG stream input to the recording data creation section 1 is input to a demultiplexer 11, and the demultiplexer 11 demultiplexes the input MPEG stream into a PES (Packetized Elementary Stream) video signal and a PES audio signal. The PES video signal demultiplexed by the demultiplexer 11 is input to a video buffer 12, and the PES audio signal demultiplexed by the demultiplexer 11 is input to an audio buffer 13. The video buffer 12 and the audio buffer 13 store the input signals and output them in accordance with the TS contained in the PES header of each signal.

From the data header of the signal stored in the video buffer 12, a detection section 14 detects, a PTS (Presentation Time Stamp), a DTS (Decoding Time Stamp), an SCR (System Clock Reference) (or PCR (Program Clock Reference)), a VBV (Video Buffer Verifier) delay value, and a bit rate; detects the PTS, the bit rate, the VBV delay value, and the amount of offset from the data header of the signal stored in the audio buffer 13; and outputs them to a control section 15.

When the delay section 16 receives the input of the video signal output by the video buffer 12, the delay section 16 delays the video signal by a predetermined time. The control section 15 detects the amount of deviation between the video data and the audio data based on the data input from the detection section 14, creates AUX (auxiliary) data (containing the data of the detected amount of deviation) (described later by using FIG. 3), to be added to the data created in a multiplexer 17, and outputs it to the multiplexer 17. The control section 15, where necessary, generates a control signal for controlling the addition of a copy picture (described later by using FIG. 5), an audio signal corresponding to the lag between the video signal and the audio signal, or a control signal for controlling the addition of an audio signal corresponding to the copy picture, and outputs it to the multiplexer 17.

The multiplexer 17 combines, in accordance with the control signal input from the control section 15, the video signal input from the delay section 16, the audio signal input from the audio buffer 13, and system data (containing AUX data) input from the control section 15. When a control signal indicating the addition of a copy picture is input from a control section 44, the multiplexer 17 adds, in accordance with this signal, a copy picture (described later by using FIG. 5). When a control signal indicating the addition of audio data is input, audio data corresponding to a copy picture is added in accordance with this signal and is output to an ECC (Error Check and Correct) section 18. The ECC section 18 adds, to a data stream input from the multiplexer 17, an ECC (Error Correcting Code), which is a redundancy code which is added separately from the main data, in order to correct errors, such as bit garbling, and outputs it to a data conversion section 19.

The data conversion section 19 performs on the input data 24–25 conversion such that a single redundant bit selected so that, for example, the pilot components for tracking appear strongly or performs randomizing such that 1 or 0 does not continue, modulates the data according to a method suitable for recording on the magnetic tape 2 (for example, NRZ (Non-Return to Zero)), amplifies it, and outputs it to a magnetic head 20. The magnetic head 20 records the data on the magnetic tape 2 in accordance with the signal input from the data conversion section 19.

Furthermore, a drive 3 is connected to the control section 15, and a magnetic disk 21, an optical disk 22, a magneto-optical disk 23, or a semiconductor memory 24 is loaded into the drive 3 where necessary, so that data is exchanged.

Figure 2:
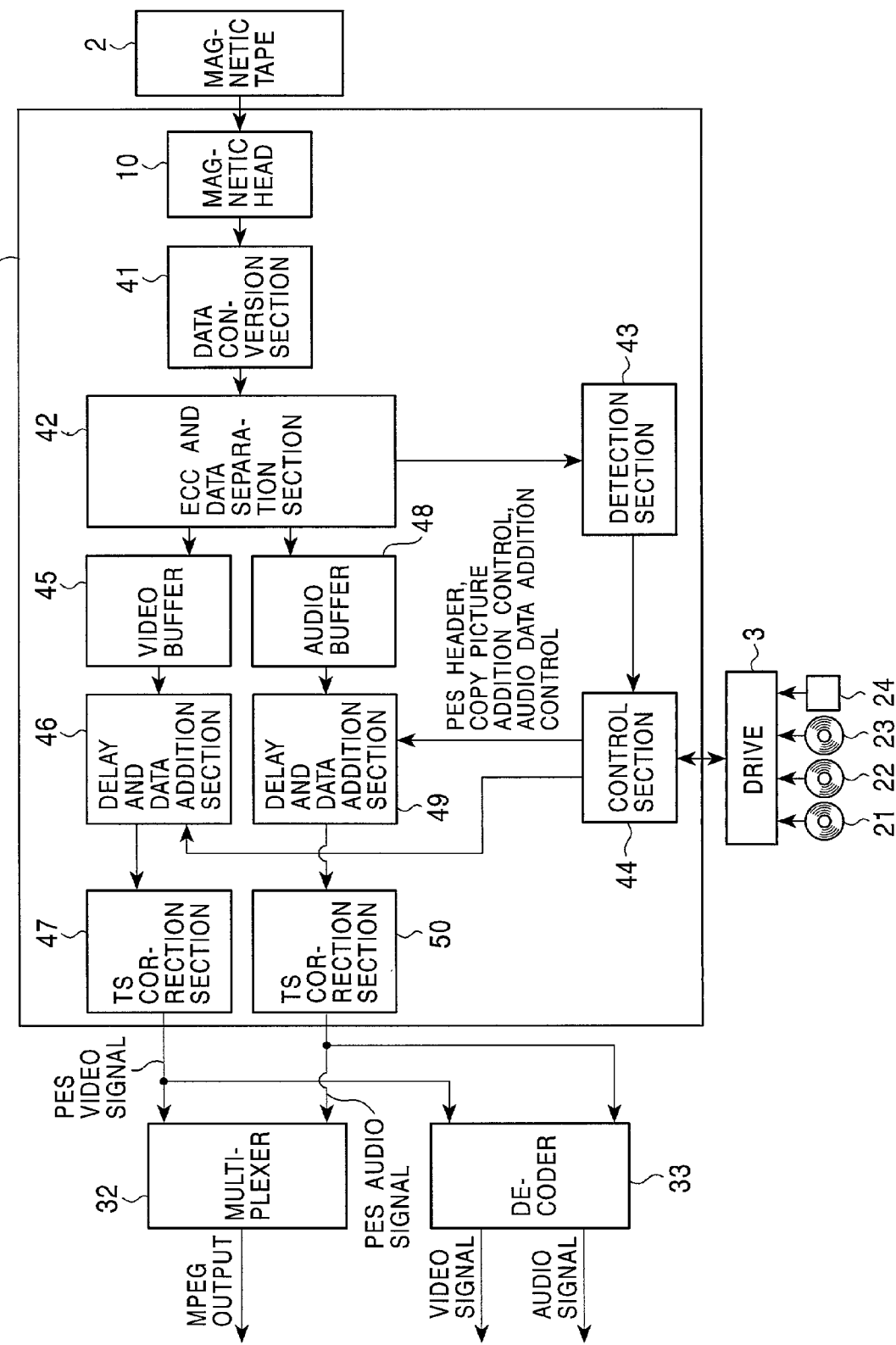
FIG. 2 is a block diagram showing the construction of a recording data playback section.

FIG. 2 is a block diagram showing the construction of a recording data playback section 31 for playing back and outputting data recorded on the magnetic tape 2 or for combining by a multiplexer 32 and outputting it as an MPEG stream in a magnetic tape playback section or a magnetic tape recording/playback section. Components in FIG. 2 corresponding to those of FIG. 1 are given the same reference numerals, and accordingly, descriptions thereof are omitted where appropriate.

The data recorded on the magnetic tape 2 is read by a magnetic head 20 and is output to a data conversion section 41. The data conversion section 41 performs 25–24 conversion such that, for example, a single redundant bit, which is selected and is added so that pilot components for tracking appear strongly, is deleted from the input data, derandomizes the data recorded on the magnetic tape 2 because the data recorded on the magnetic tape 2 has been subjected to randomizing such that conversion is performed so that 1 or 0 does not continue, performs format conversion thereon, outputs the data to an ECC and data separation section 42.

The ECC and data separation section 42 performs error checking and correction by using an ECC added to the input data, separates it into a video signal and an audio signal, outputs the video signal to a video buffer 45, and outputs the audio signal to an audio buffer 48.

A detection section 43 detects the PTS, the DTS, the SCR, the VBV delay value, and the bit rate from the AUX packet of the video signal within the data of the ECC and data separation section 42, detects the PTS, the bit rate, the VBV delay value, and the amount of offset from the AUX packet of the audio signal, and outputs them to a control section 44.

The control section 44 detects the amount of deviation between the video data and the audio data on the basis of the data input from the detection section 43, creates a PES header to be added to the data created in a delay and data addition section 46 and in a delay and data addition section 49, outputs it to the delay and data addition section 46 and the delay and data addition section 49, creates, where necessary, a control signal for controlling the addition of a copy picture (described later by using FIG. 5), an audio signal corresponding to the deviation between the video signal and the audio signal, or a control signal for controlling the addition of an audio signal corresponding to a copy picture, and outputs it to the delay and data addition section 46 and the delay and data addition section 49.

The video buffer 45 and the audio buffer 48 store the input signal, and, in accordance with the TS contained in the AUX data, output it to the delay and data addition section 46 and the delay and data addition section 49. When the delay and data addition section 46 receives the input of the video signal output by the video buffer 45, the delay and data addition section 46 delays the video signal by a predetermined time in accordance with the control signal input from the control section 44. When a control signal indicating the addition of a copy picture is input from the control section 44, the delay and data addition section 46 adds, in accordance with this signal, a copy picture (described later by using FIG. 5), and outputs it to a TS correction section 47. Also, when the delay and data addition section 49 receives the input of the audio signal output by the audio buffer 48, the delay and data addition section 49 delays, in accordance with the control signal input from the control section 44, the audio signal by a predetermined time, and when a control signal indicating the addition of audio data is input from the control section 44, the delay and data addition section 49 adds, in accordance with this signal, the audio data corresponding to the copy picture, and outputs it to a TS correction section 50.

The TS correction section 47 and the TS correction section 50 refer to the TS of the data supplied from the delay and data addition section 46 and the delay and data addition section 49 in order to correct the value of the TS which is deviated due to the processing of the delay and data addition section 46 and the delay and data addition section 49, and output them as a PES video signal and a PES audio signal to a multiplexer 32 and a decoder 33, respectively.

The multiplexer 32 combines the input PES video signal and the input PES audio signal in order to create an MPEG stream, and outputs it. The decoder 33 decodes the input PES video signal and the input PES audio signal, outputs the decoded video signal to, for example, a monitor (not shown) so as to display it, and outputs the decoded audio signal to, for example, a speaker (not shown) so as to produce audio output.

Although in FIGS. 1 and 2, the construction for recording an MPEG stream on the magnetic tape 2 and the construction for playing back the data recorded on the magnetic tape 2 are described separately, the present invention can be applied to any one of a magnetic tape recording apparatus having only the recording data creation section 1 described using FIG. 1, a magnetic tape playback apparatus having only the recording data playback section 31 described using FIG. 2, and a magnetic tape recording/playback apparatus (or a magnetic tape editing apparatus) having both the recording data creation section 1 and the recording data playback section 31 described using FIGS. 1 and 2.

Next, referring to FIG. 3, data recorded on the magnetic tape 2 will be described.

An MPEG stream is separated into audio AUX data, audio data, video AUX data, and video data, having a predetermined amount of data, by the recording data creation section 1 described using FIG. 1, is converted into a format in which recording is possible on the magnetic tape 2, and is repeatedly recorded in a time series on the magnetic tape 2. The video AUX data contains the values of the PTS, the DTS, the SCR, the bit rate, the VBV delay, and the offset of the video data which follows immediately after the video AUX data. The audio AUX data contains the values of the PTS, the bit rate, the VBV delay, and the offset of the audio data which follows immediately after the audio AUX data.

Then, the data recorded on the magnetic tape 2 is read in a time series in the direction of travel of the tape in the playback data creation section described using FIG. 2, video data is played back based on the values of the PTS, the DTS, the SCR, the bit rate, the VBV delay, and the offset, contained in the video AUX data, and audio data is played back based on the values of the PTS, the bit rate, the VBV delay, and the offset, contained in the audio AUX data.

Next, referring to FIGS. 4 to 7, a description will be given of a case in which different streams are tag-recorded (edited).

For example, in a case where it is desired to connect a stream 2 such as that shown in FIG. 4B to a stream 1 such as that shown in FIG. 4A and to edit these streams, editing is performed based on the video data. That is, editing is performed in such a way that a video 3 of the stream 1 of FIG. 4A becomes continuous with the video I of the stream 2 of FIG. 4B. Here, if, in a portion where the extending-off portion of audio 5 with respect to the video 3 of the stream 1 overlaps the audio I of the stream 2, the audio I is erased, the audio data loses continuity, and unnatural playback data in which audio is interrupted results.

For this reason, like a stream 3 shown in FIG. 4C, by shifting the audio I to the audio III of the stream 2 backward in the direction of a time axis so that the audio I of the stream 2 is connected to the audio 5 of the stream 1, playback data which is not unnatural can be obtained.

Also, in order to prevent an overflow of a video decoder buffer (for example, the video buffer 45 described using FIG. 2) for buffering video data during playback, a method is sometimes used in which an overflow is prevented in such a way that for a still image having a very small coding rate (for example, the same image data as the image data immediately before the connection point of the video data (hereinafter referred to as a "copy picture")), a connection point is inserted so that the processing termination of the video decoder buffer is awaited. During the time in which the inserted copy picture is played back, for example, if a soundless state occurs or the audio data before the connection point is repeatedly played back, unnatural audio data results.

In a point immediately after the video 3 (picture B) (point indicated by x in the figure) of the stream 1 shown in FIG. 5A, when a stream 2 shown in FIG. 5B is connected and edited, a copy picture is inserted between the video 3 and the video I (picture I). For this reason, like the stream 3 shown in FIG. 5C, by using audio 6, which is audio data, corresponding to the video 4 (picture I or picture P) of the stream 1 to be deleted, as audio data of the connection point of the stream 3 without deleting the audio 6, playback data which is not unnatural can be obtained. The insertion of the audio 6 between the audio 5 and the audio I is, to be specific, to shift the playback position of the audio I to after the audio 6.

Also, in a point immediately after the video 2 (a point indicated by x in the figure) of the stream 1 shown in FIG. 6A, when the portion of and subsequent to the video II of the stream 2 shown in FIG. 6B (the point indicated by y in the figure) is connected and edited, and the stream 3 shown in FIG. 6C is created, if a no-sound portion occurs like the audio stream 1 of FIG. 6C, unnatural playback data results. Furthermore, like the audio stream 2, a method of making audio III directly continuous with the stream 3 may be used. The proceeding of the audio data earlier than the video data is not possible in a natural state, and unnatural playback data still results. For this reason, as shown in the audio stream 3, by using the audio 4, which is the audio data corresponding to the video 3 to be deleted, of the stream 1 without deleting the audio 4 (by inserting the audio 4 between the audio 3 and the audio III), playback data which is not unnatural can be obtained. The insertion of the audio 4 between the audio 3 and the audio III is, to be specific, to shift the playback position of the audio III to after the audio 4.

The audio data used for the connection point, described using FIGS. 5 and 6, basically corresponds to the video data to be deleted by editing. That is, in the data, recorded on the magnetic tape 2, shown in FIG. 7, in a case where it is desired to connect video data to video n which is at the recording termination point of the main stream 1, and to erase the video data of video n+1 and subsequent video data, there occurs a necessity of causing several pieces of audio data within the audio data of audio n+1 and subsequent audio data to remain as audio data for copy pictures without being erased (over-recording).

The editing process described using FIGS. 4 to 7 may be performed during data recording time or during data playback time.

Figure 8:
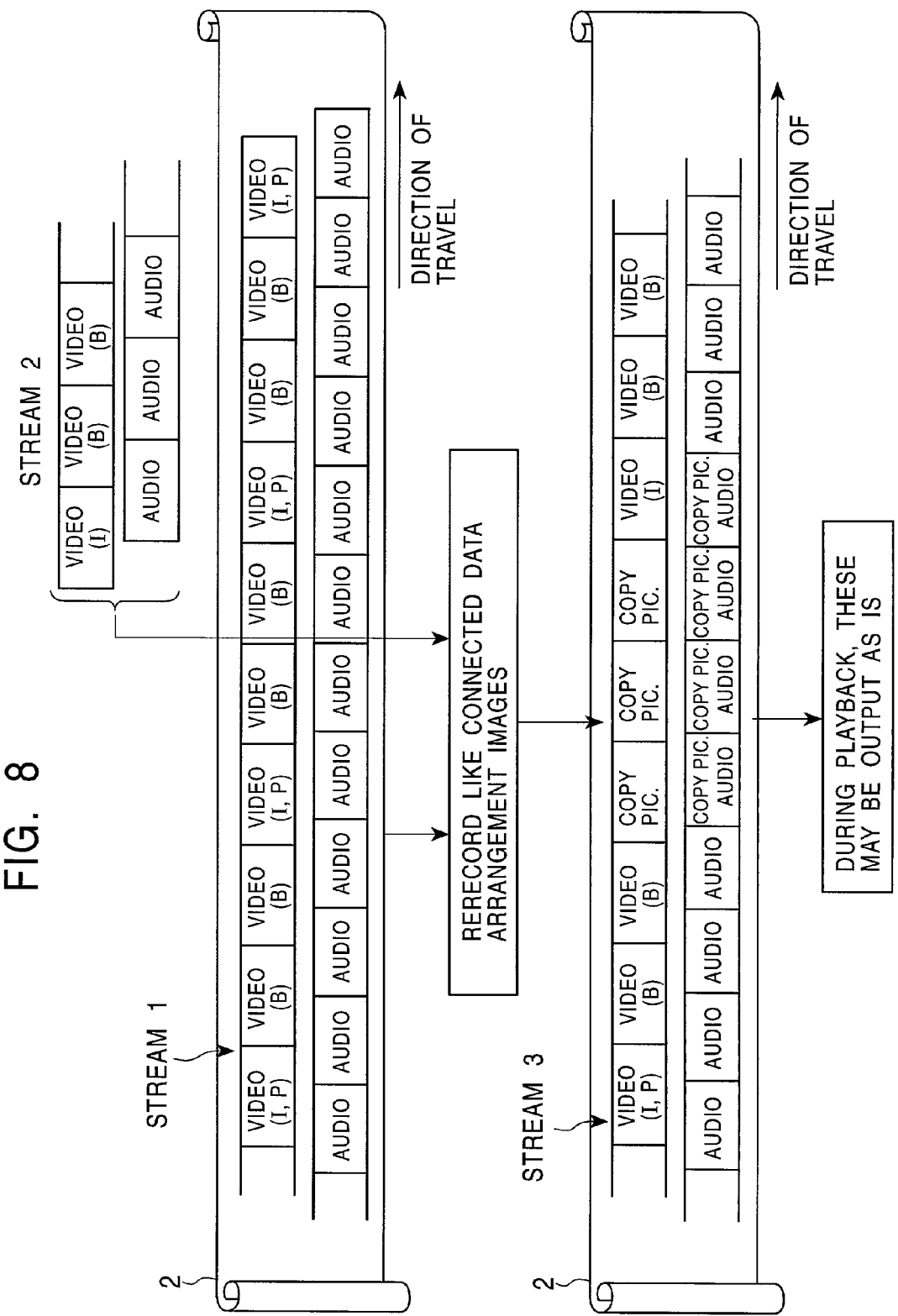
FIG. 8 is a diagram illustrating a case in which input data is rearranged like connected data arrangement images and is recorded.

More specifically, in a case where the stream 2 is connected after predetermined video data of the stream 1 as base data and is edited, as shown in FIG. 8, in the recording data creation section 1 described using FIG. 1, the above-described copy picture and the audio data for the copy picture, corresponding to the copy picture, may be used so that the video data and the audio data are rearranged like connected data arrangement images and is recorded on the magnetic tape 2. During playback, in the recording data playback section 31 described using FIG. 2, the video data and the audio data may be output as is recorded on the magnetic tape 2.

In a case where each of the stream 1 and the stream 2 is input, as an MPEG input, to the recording data creation section 1, under the control of the control section 15, the addition of a copy picture at the connection point and the rearrangement of data are performed in the multiplexer 17, and the rearranged data is recorded on the magnetic tape 2 via the ECC section 18, the data conversion section 19, and the magnetic head 20.

Furthermore, in a case where the stream 1 is recorded on the magnetic tape 2 in advance, for example, in the recording data playback section 31 of the magnetic tape recording/playback apparatus (magnetic tape editing apparatus) having both the recording data creation section 1 and the recording data playback section 31, the data recorded on the magnetic tape 2 may be read once and converted into an MPEG stream and then may be input to the recording data creation section 1 by a multiplexer 32. Then, under the control of the control section 15, the addition of the copy picture and the rearrangement of the data may be performed in the multiplexer 17.

In this manner, in a case where the data is rearranged like connected data arrangement images and is recorded, since the data becomes continuous on the magnetic tape 2, the arrangement of the data does not vary, irrespective of where playback is started. Furthermore, the synchronization with another data stream can be easily realized.

Figure 9:
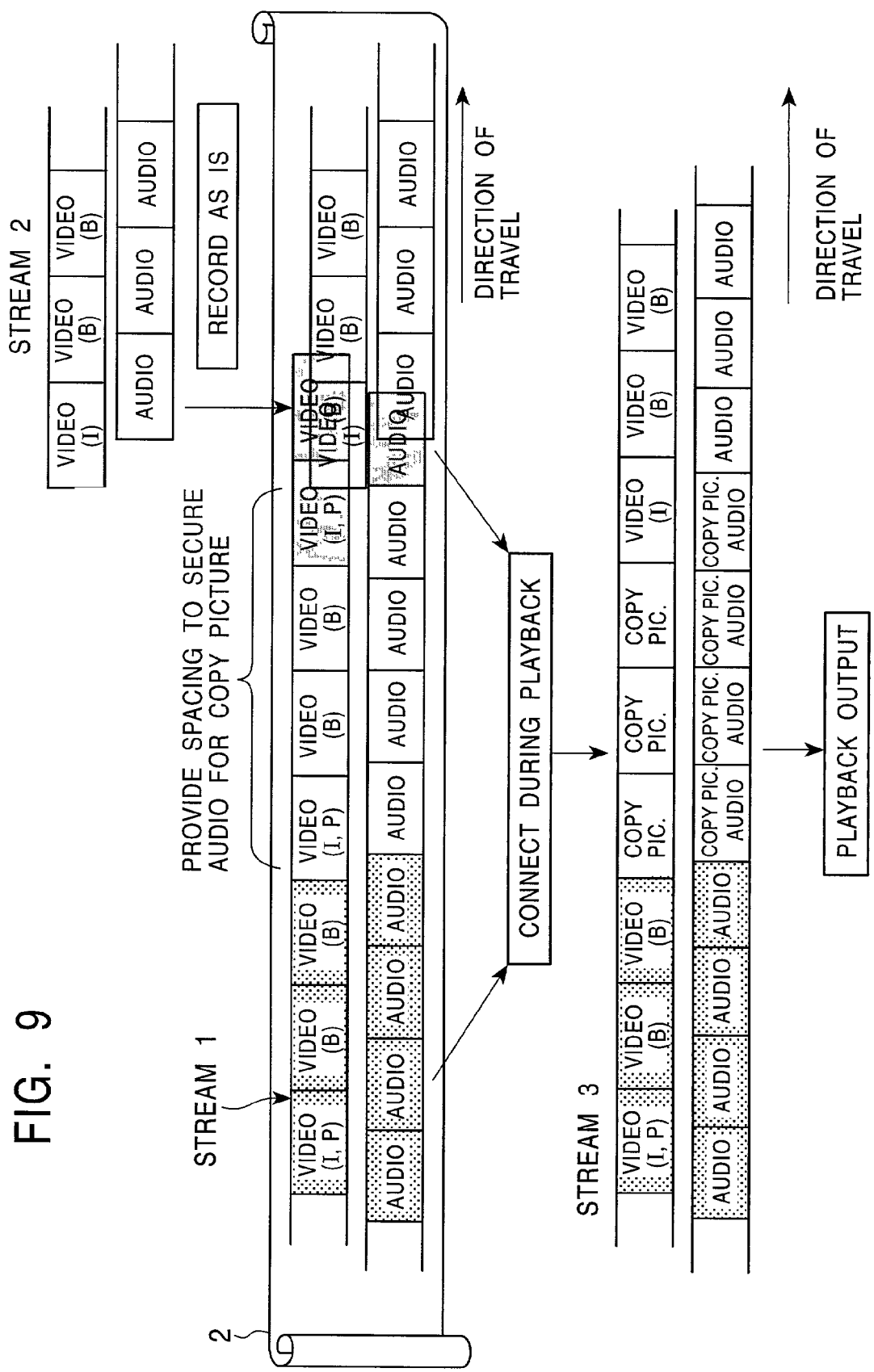
FIG. 9 is a diagram illustrating a case in which the recorded data is rearranged like connected data arrangement images and is played back.

Alternatively, as shown in FIG. 9, in the recording data creation section 1 described using FIG. 1, during recording onto the magnetic tape 2, a predetermined spacing may be provided from the final data of the stream 1 in order to secure audio for a copy picture, and the stream 2 may be overwritten. In the recording data playback section 31 described using FIG. 2, during playback, the video data and the audio data may be rearranged and played back like connected data arrangement images.

During playback, when the data is rearranged like connected data arrangement images, a stream recording process can be simplified in comparison with a case in which the data is rearranged like connected data arrangement images and is recorded. Also, since the data recorded on the magnetic tape 2 is very close to the data before being edited, even when a data playback method or a data editing method is changed, it is easy to deal with the change.

Figure 10:
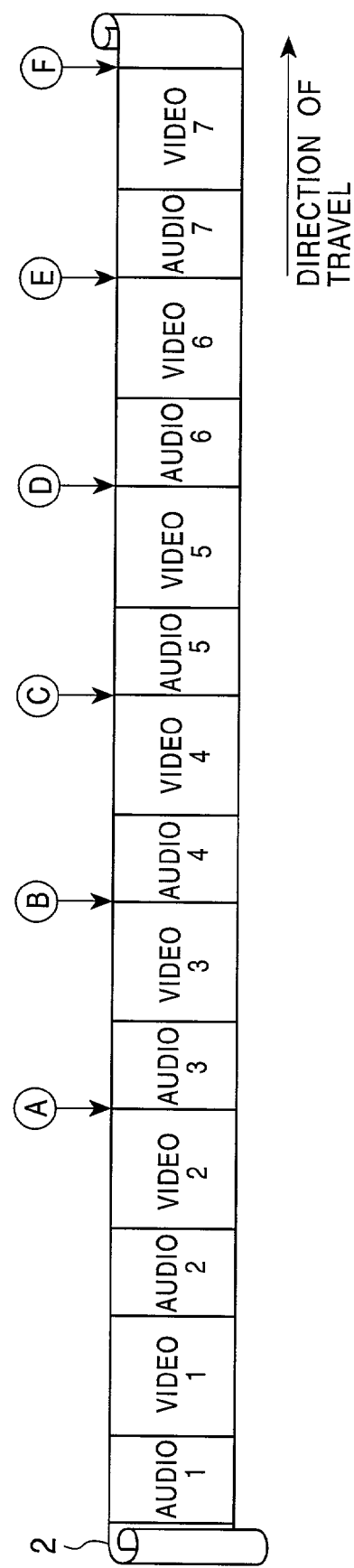
FIG. 10 is a diagram illustrating an overwrite starting point in the case of FIG. 9.

In this case, the amount of over-recording described using FIG. 7 becomes a problem. That is, if attempts are made to cause a lot of remaining audio data to remain, a lot of invalid video data also remains, and the recording capacity of the magnetic tape 2 is wasted. As shown in FIG. 10, when it is desired to connect the stream 2 to immediately after the video 2 recorded on the magnetic tape 2 and to edit it (that is, the position indicated by point A in the figure becomes the connection point), the amount of data of the remaining audio data and the invalid video data differ depending on the position where overwriting of the stream 2 is started.

FIG. 11 shows the amounts of data of remaining audio data and invalid video data in a case where the overwriting of the stream 2 is started at points A to F in FIG. 10. As shown in FIG. 11, when the overwrite starting point is point A (that is, when the stream 2 is overwritten immediately after the connection point), invalid video data does not occur, and there is also no remaining audio data, thereby making playback of the audio data at the connection point difficult. When the overwrite starting point is set after the connection point A with respect to time, invalid video data does occur, and the remaining audio data remains on the magnetic tape 2, thereby allowing the audio data to be played back like connected data arrangement images during playback. The number of remaining pieces of remaining audio data may be set to a predetermined number (for example, 9 in the number of TSs), and may be set by a user.

Figure 12:
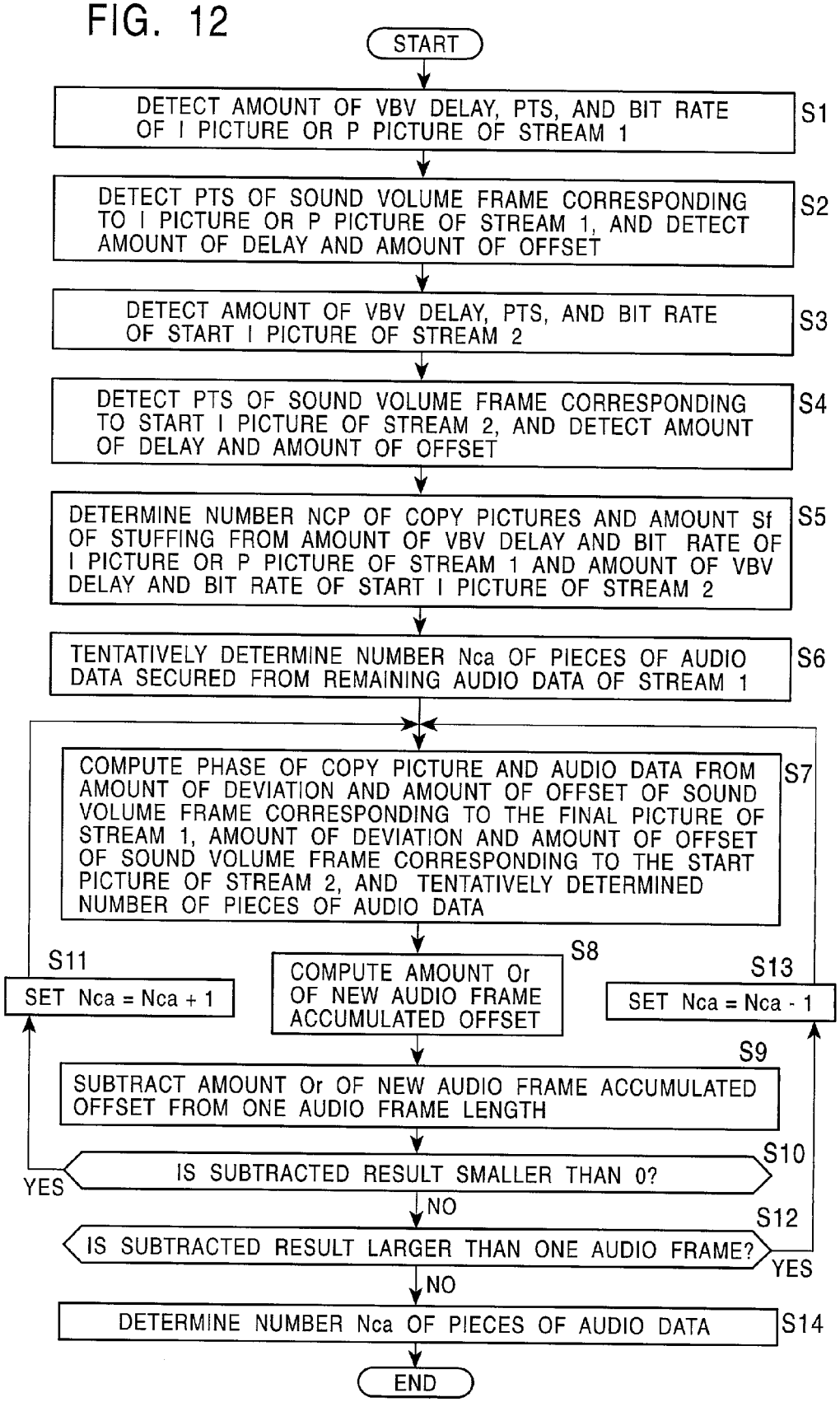
FIG. 12 is a flowchart illustrating a process for arranging data like connected data arrangement images.

Next, referring to FIG. 12, a description will be given of a process for creating connected data arrangement images, performed by the detection section 14 and the control section 15 of the recording data creation section 1 described using FIG. 1, or performed by the detection section 43 and the control section 44 of the recording data playback section 31 described using FIG. 2.

Figure 13:
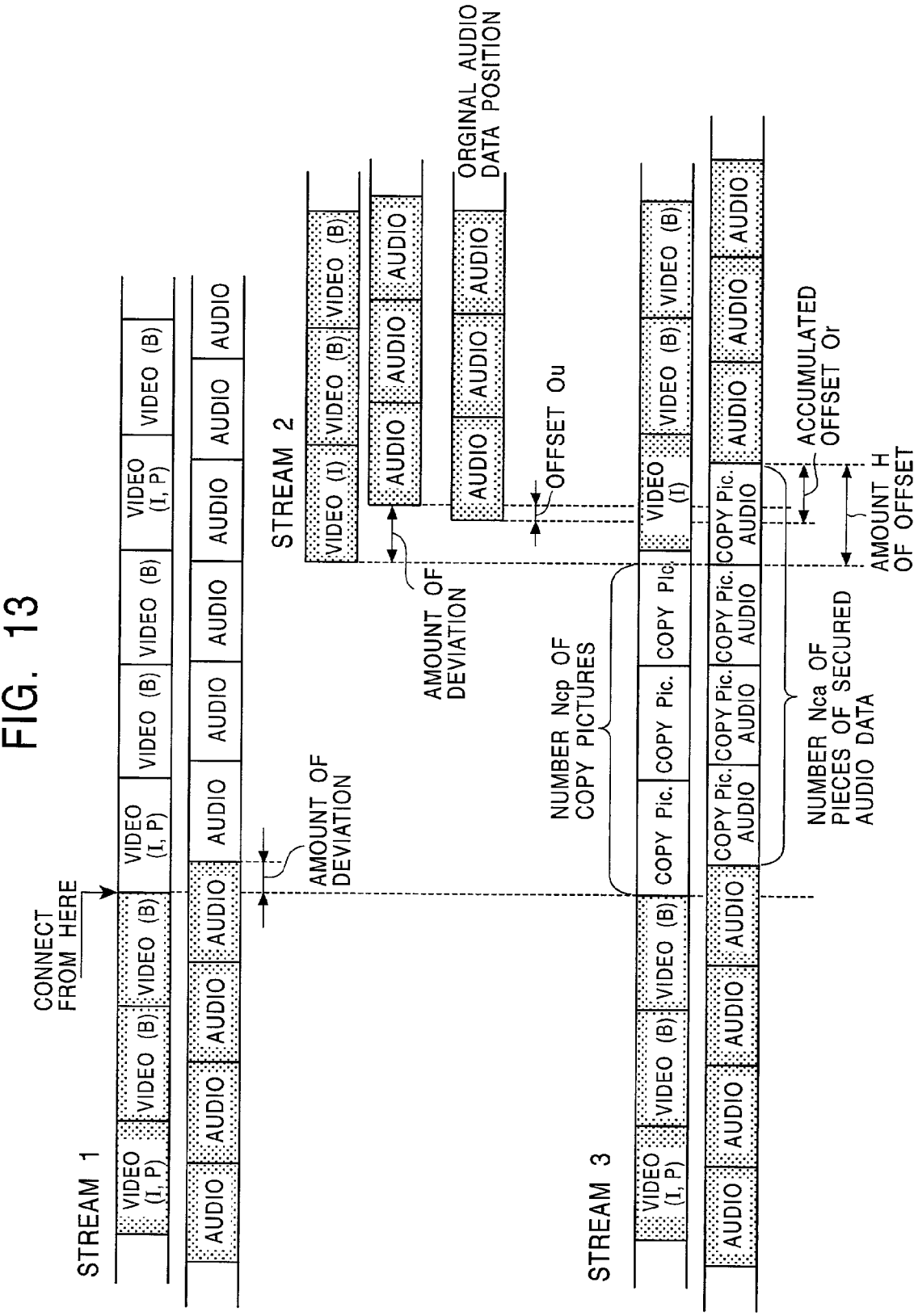
FIG. 13 is a diagram illustrating the amount of deviation, the offset, the number of copy pictures, and the number of pieces of secured audio data of the data arranged like connected data arrangement images.

In step S1, the detection section 14 of the recording data creation section 1 (or the detection section 43 of the recording data playback section 31, and the same applies hereinafter) detects the amount of VBV delay, the PTS, and the bit rate of an I picture or a P picture (that is, a picture which is erased after being connected), which is the next picture after the connection point of the stream 1, and outputs them to the control section 15 of the recording data creation section 1 (or the control section 44 of the recording data playback section 31, and the same applies hereinafter). In step S2, the detection section 14 detects the PTS of the start audio frame corresponding to the picture for which the amount of VBV delay, the PTS, and the bit rate have been detected in step S1, detects the amount of deviation and the amount of offset from the value of the PTS, and outputs them to the control section 15. As shown in FIG. 13, the amount of deviation of the stream 1 is the amount of deviation between the final video frame at the connection point and the audio frame corresponding thereto.

The detection section 14 detects the amount of VBV delay, the PTS, and the bit rate of the start I picture of the stream 2 in step S3, detects the PTS of the audio frame corresponding to the start I picture of the stream 2, and detects the amount of deviation and the amount of offset from the value of the PTS in step S4. As shown in FIG. 13, the amount of deviation of the stream 2 is the amount of deviation of the start position of the audio data corresponding to the start video data which is connected at the connection point, the amount Ou of offset being contained in this amount of deviation.

In step S5, the control section 15 determines the number Ncp of copy pictures and the amount Sf of stuffing, based on the amount of VBV delay and the bit rate of the I picture or the P picture of the stream 1, and based on the amount of VBV delay and the bit rate of the start I picture of the stream 2.

More specifically, if the coding rate of the picture of the stream 1, which is erased after tag-recording, is denoted as Fs, the coding rate Fs is given by equation (1) below:

$$Fs = ds \times Rs \quad (1)$$

where ds is assumed to be the amount of VBV delay of the stream 1, detected in step S1, and Rs is assumed to be the bit rate of the stream 1, detected in step S1.

Then, if the coding rate of the start I picture of the stream 2, which is overwritten during tag-recording, is denoted as Fu, the coding rate Fu is given by equation (2) below:

$$Fu = du \times Ru \quad (2)$$

where du is assumed to be the amount of VBV delay of the stream 2, detected in step S3, and Ru is assumed to be the bit rate of the stream 2, detected in step S3.

Then, under the condition of Fu>Fs, the minimum number Ncp of copy pictures and the amount Sf of stuffing, which satisfy the following equation (3), are determined:

$$Fu = Fs + Ncp \times 1 \text{ picture time} \times Rs - Sf \qquad (3)$$

Furthermore, under the condition of Fu≦Fs, the number Ncp of copy pictures and the amount Sf of stuffing satisfy the following equations (4):

$$Fu = Fs - Sf, Ncp = 0 \qquad (4)$$

In step S6, the control section 15 tentatively determines the number Nca of pieces of audio data to be provided based on the remaining audio data of the stream 1 recorded by over-recording described using FIG. 8. More specifically, if the number of TSs of one frame of the video data is 3003 and the number of TSs of one frame of the audio data is 2160, the number Nca of pieces of audio data, which satisfies the following equation (5), is computed as shown below:

$$Psv + Ncp \times 3003 \leq Psa + Nca \times 2160 \qquad (5)$$

where Psv indicates the PTS value of the I picture or the P picture to be erased, detected in step S1, and Psa indicates the PTS value of the I picture or the P picture to be erased, detected in step S2.

In step S7, the control section 15 computes the phases of the copy picture and the audio data, that is, the amount H of extending-off shown in FIG. 13, based on the amount of deviation and the amount of offset of the audio frame corresponding to the final picture of the stream 1, the amount of deviation and the amount of offset of the audio frame corresponding to the start I picture of the stream 2, and the number of pieces of audio data, which was tentatively determined in step S6. The amount H of extending-off is computed based on the following equation (6):

$$H = (Psa + Nca \times 2160) - (Psv + Ncp \times 3003) \qquad (6)$$

In step S8, the control section 15 computes a new audio frame accumulated offset amount Or shown in FIG. 13 based on the detection result in step S3, the detection result in step S4, and the detection result in step S7. The new audio frame accumulated offset amount Or is expressed based on the following equation (7):

$$Or = Ou + H - (Puv - Pua) \qquad (7)$$

where Ou indicates the value of the offset of the stream 2, detected in step S4, Puv indicates the PTS value of the start I picture of the stream 2, detected in step S3, and Pua indicates the PTS value of the audio data of the start I picture of the stream 2, detected in step S4.

In step S9, the control section 15 subtracts the new audio frame accumulated offset amount Or from one audio frame, and determines in step S10 whether or not the subtracted result is smaller than 0.

When it is determined in step S10 that the subtracted result is smaller than 0, since the position of the start audio frame of the stream 2 leads the original position, the control section 15 sets Nca=Nca+1 in step S12, the process returns to step S7, and processing of step S7 and subsequent steps is repeated.

When it is determined in step S10 that the subtracted result is not smaller than 0, the control section 15 in step S12 whether or not the subtracted result is greater than one audio frame.

When it is determined in step S12 that the subtracted result is greater than one audio frame, since extra audio data for a copy picture has been added, the control section 15 sets Nca=Nca−1 in step S13, the process returns to step S7, and processing of step S7 and subsequent steps is repeated.

When it is determined in step S12 that the subtracted result is not greater than one audio frame, since the number Nca of pieces of audio data for copy pictures is the optimal number, the control section 15 determines the number Nca of pieces of audio data in step S14, and the processing is terminated.

According to the processing which has thus been described, as described using FIG. 8, even if data is rearranged like connected data arrangement images during recording of data on the magnetic tape 2, and even if data is rearranged like connected data arrangement images when data is played back from a magnetic tape, as described using FIG. 9, connected audio data can be played back continuously. Thus, problems, such as audio data being connected unnaturally or audio data at the connection point and subsequent thereto being played back earlier than the corresponding video data, do not occur. In addition, since audio data is connected together without performing re-encoding, degradation in sound quality does not occur.

Furthermore, since the phase lag between video data and audio data, which occurs due to editing, is stored by being contained in data, and is thereby managed, it is possible to return to the original after editing and to limit the amount of deviation, where necessary. The management of the phase lag between the video data and the audio data is not always necessary for all the apparatuses receiving these data streams.

The above-described series of processes can also be performed by software. For the software, programs which form the software are installed from a recording medium into a computer incorporated into dedicated hardware or, for example, a general-purpose personal computer capable of executing various types of functions by installing various programs.

This recording medium, as shown in FIGS. 1 and 2, is constructed by packaged media formed of the magnetic disk 21 (including a floppy disk), the optical disk 22 (including a CD-ROM (Compact Disk-Read Only Memory), and a DVD (Digital Versatile Disc)), the magneto-optical disk 23 (including an MD (Mini-Disk)), or the semiconductor memory 24, in which programs are recorded, which is distributed separately from the computer so as to distribute programs to a user.

In this specification, steps which describe a program recorded in a recording medium contain not only processing performed in a time-series manner along the described sequence, but also processing performed in parallel or individually, although the processing is not necessarily performed in a time-series manner.

According to the information processing apparatus, the image processing method, and the program recorded on a recording medium in accordance with the present invention, it is possible to continuously play back natural audio data at the connection point of two MPEG streams without causing a failure of a buffer to occur. Moreover, the amount of shift can be managed in the created third stream.

According to the information processing apparatus, the image processing method, and the program recorded on a recording medium in accordance with the present invention, since audio data corresponding to image data to be erased of the first stream can be played back at the connection point of the first stream and the second stream when recorded data is played back, it is possible to record recording data such that natural audio data can be played back continuously.

According to the information processing apparatus, the image processing method, and the program recorded on a recording medium in accordance with the present invention, since audio data corresponding to image data to be erased of the first stream can be played back at the connection point of the first stream and the second stream, it is possible to continuously play back natural audio data.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for receiving an input of a first data stream and a second data stream and for connecting said second data stream at a predetermined position of said first data stream and recording them, said information processing apparatus comprising:

separation means for separating each of said first data stream and said second data stream into video data and audio data;

first detection means for detecting a first amount of deviation, with respect to time, between said video data and said audio data of said first data stream, which are separated by said separation means, and a second amount of deviation, with respect to time, between said video data and said audio data of said second data stream, which are separated by said separation means;

first computation means for computing an amount of shift of said audio data of said second data stream with respect to said video data of said second data stream on the basis of said first and second amounts of deviation detected by said first detection means;

creation means for combining said video data of said first data stream and said second data stream, said audio data of said first data stream and said second data stream, and system data containing said amount of shift computed by said first computation means in order to create a third data stream;

control means for controlling, based on said amount of shift computed by said first computation means, said creation means in such a way that said audio data of said second data stream is shifted in time with respect to said video data of said second data stream corresponding thereto; and recording control means for controlling recording of said third data stream created by said creation means onto a recording medium.

2. An information processing apparatus according to claim 1, further comprising:

second detection means for detecting a first coding rate of said video data of one picture at a connection point of said first data stream with respect to said second data stream, and a second coding rate of said video data of one picture at a connection point of said second data stream with respect to said first data stream; and second computation means for computing, based on said first and second coding rates detected by said second detection means, an amount of still image data inserted at the connection point of said first data stream and said second data stream, wherein, when it is determined by said second computation means that the amount of still image data is not zero, said creation means further combines said still image data, of the amount of still image data computed by said second computation means, with said video data of said first data stream and said second data stream, said audio data of said first data stream and said second data stream, and the system data containing said amount of shift computed by said first computation means in order to create said third data stream.

3. An information processing apparatus according to claim 1, wherein said audio data of said second data stream is shifted by said control means so that said audio data is played back continuously without being re-encoded.

4. An information processing apparatus according to claim 1, further comprising:

reading control means for controlling reading of said first data stream recorded on said recording medium; and input control means for controlling the input of said first data stream read by said reading control means into said separation means.

5. An information processing apparatus according to claim 1, wherein said first data stream and said second data stream are MPEG data streams.

6. An information processing method for use with an information processing apparatus for receiving an input of a first data stream and a second data stream and for connecting said second data stream at a predetermined position of said first data stream and recording them, said information processing method comprising the steps of:

separating each of said first data stream and said second data stream into video data and audio data;

detecting a first amount of deviation, with respect to time, between said video data and said audio data of said first data stream, which are separated in said separation step, and a second amount of deviation, with respect to time, between said video data and said audio data of said second data stream, which are separated in said separation step;

computing an amount of shift of said audio data of said second data stream with respect to said video data of said second data stream on the basis of said first and second amounts of deviation detected in said detection step;

combining said video data of said first data stream and said second data stream, said audio data of said first data stream and said second data stream, and system data containing said amount of shift computed in said computation step in order to create a third data stream;

controlling, based on said amount of shift computed in said computation step, said creation step in such a way that said audio data of said second data stream is shifted in time with respect to said video data of said second data stream corresponding thereto; and controlling recording of said third data stream created in said creation step on a recording medium.

7. A recording medium having recorded thereon a computer-readable program for use with an information processing apparatus for receiving the input of a first data stream and a second data stream and for connecting said second data stream at a predetermined position of said first data stream and recording them, said program comprising the steps of:

separating each of said first data stream and said second data stream into video data and audio data;

detecting a first amount of deviation, with respect to time, between said video data and said audio data of said first data stream, which are separated in said separation step, and a second amount of deviation, with respect to time, between said video data and said audio data of said second data stream, which are separated in said separation step;

computing an amount of shift of said audio data of said second data stream with respect to said video data of said second data stream on the basis of said first and second amounts of deviation detected in said detection step;

combining said video data of said first data stream and said second data stream, said audio data of said first data stream and said second data stream, and system data containing said amount of shift computed in said computation step in order to create a third data stream;

controlling, based on said amount of shift computed in said computation step, said creation step in such a way that said audio data of said second data stream is shifted in time with respect to said video data of said second data stream corresponding thereto; and controlling recording of said third data stream created in said creation step onto a recording medium.

* * * * *